United States Patent
Meek

[19]

[11] Patent Number: 5,577,097
[45] Date of Patent: Nov. 19, 1996

[54] DETERMINING ECHO RETURN LOSS IN ECHO CANCELLING ARRANGEMENTS

[75] Inventor: Quentin J. Meek, Gloucester, Canada

[73] Assignee: Northern Telecom Limited, Montreal, Canada

[21] Appl. No.: 227,819

[22] Filed: Apr. 14, 1994

[51] Int. Cl.$^6$ ............................ H04M 1/24; H04M 9/00; H04J 15/00; H04J 1/00
[52] U.S. Cl. ................ 379/3; 379/406; 379/410; 379/411; 370/32; 370/32.1
[58] Field of Search ................ 379/3, 406, 410, 379/411; 370/32.1, 32, 17

[56] References Cited

U.S. PATENT DOCUMENTS

| | | | |
|---|---|---|---|
| 4,268,727 | 5/1981 | Agrawal | 379/411 |
| 4,360,712 | 11/1982 | Horna | 179/170.2 |
| 4,593,161 | 6/1986 | Desblache | 379/411 |
| 4,712,235 | 12/1987 | Jones, Jr. | 379/410 |
| 4,912,758 | 3/1990 | Arbel | 379/411 |
| 4,918,727 | 4/1990 | Rohrs et al. | 370/32.1 |
| 4,998,241 | 3/1991 | Brox | 379/411 |
| 5,014,263 | 5/1991 | Vairavan et al. | 370/32.1 |
| 5,062,102 | 10/1991 | Taguchi | 379/406 |
| 5,157,653 | 10/1992 | Genter | 379/410 |
| 5,193,112 | 3/1993 | Sano | 379/410 |
| 5,263,020 | 11/1993 | Yatsuzuka | 370/32.1 |
| 5,305,309 | 4/1994 | Chiyo | 379/411 |
| 5,307,405 | 4/1994 | Sih | 379/410 |
| 5,315,585 | 5/1994 | Iizuka | 379/406 |

Primary Examiner—Wellington Chin
Assistant Examiner—Vijay Shankar
Attorney, Agent, or Firm—R. John Haley

[57] ABSTRACT

In an echo cancelling arrangement, an estimated echo signal is produced by an adaptive filter from a receive path signal and is subtracted from an incoming transmit path signal to produce an outgoing transmit path signal, to compensate for ERL (echo return loss) via a hybrid circuit. Short-term averages of signal levels on the receive path and the incoming and outgoing transmit paths are produced by exponential averaging. An ERLE (echo return loss enhancement) due to the subtraction of the estimated echo signal is calculated from the incoming and outgoing transmit path averages and, when this exceeds a threshold value, enables averaging of a ratio of average levels on the receive path to average levels on the incoming transmit path. The resulting long-term average constitutes a determination of the actual ERL.

17 Claims, 1 Drawing Sheet

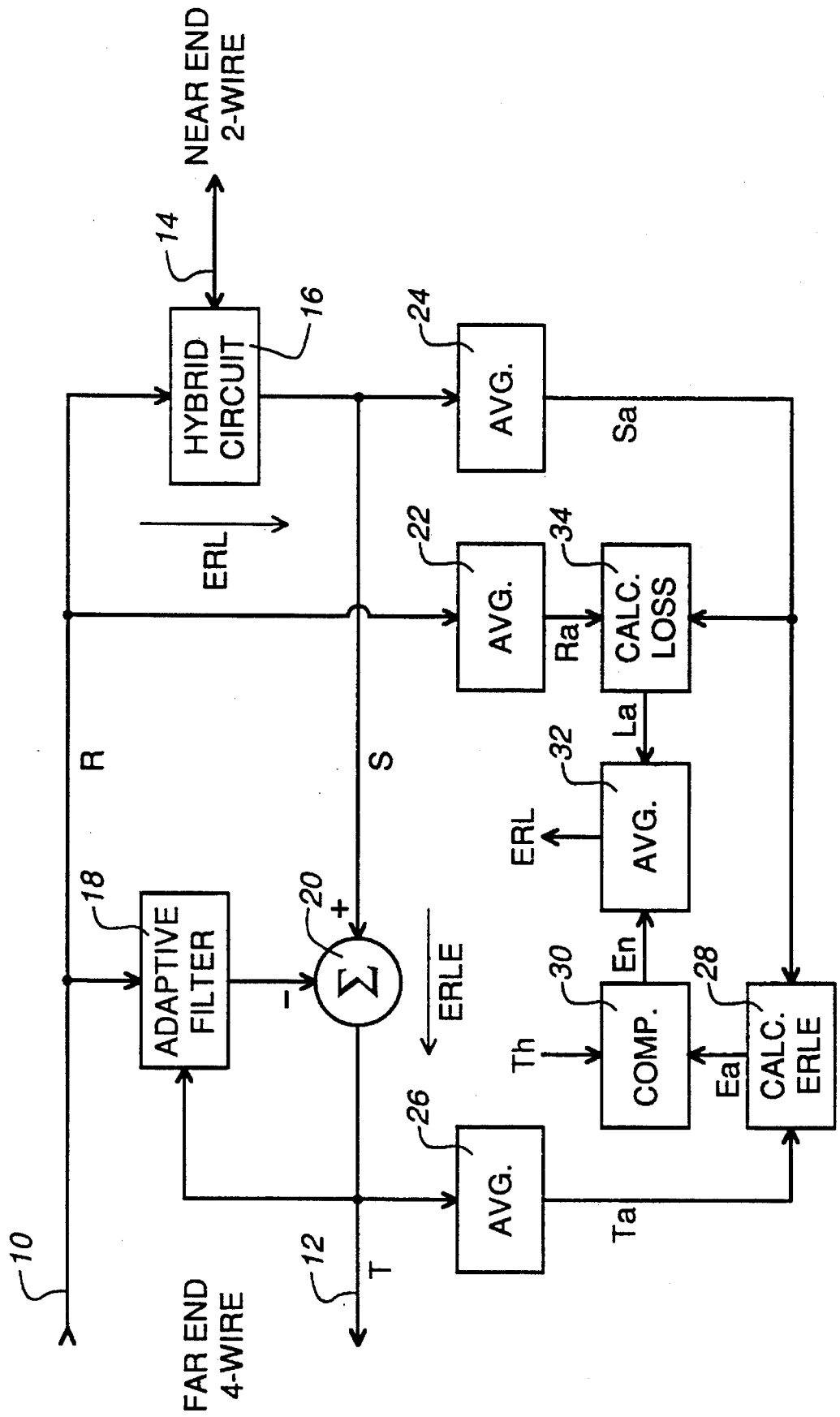

DETERMINING ECHO RETURN LOSS IN ECHO CANCELLING ARRANGEMENTS

This invention relates to determining echo return loss in echo cancelling arrangements. In this specification, as is conventional in the art, echo return loss is also referred to by the abbreviation ERL, and echo return loss enhancement (which is explained below) is generally referred to by the abbreviation ERLE.

BACKGROUND OF THE INVENTION

As is well known, four-wire and two-wire communications paths are commonly coupled by a hybrid circuit. Due to imperfect balancing of the hybrid circuit, a component of a signal incoming on the four-wire receive path, referred to as an echo signal, is inevitably but undesirably coupled to the four-wire transmit path, with an attenuation which is referred to as the echo return loss.

In order to cancel the echo signal, it is well known to provide an echo canceller which comprises an adaptive filter and a subtraction unit. The adaptive filter is supplied with the signal incoming on the four-wire receive path and produces an estimated echo signal, which the subtraction unit subtracts from the signal on the four-wire transmit path to produce an outgoing four-wire transmit path signal which includes a residual echo signal. The adaptive filter is adapted in dependence upon the residual echo signal in a manner which seeks to reduce the residual echo signal to zero, i.e. in such a manner that the estimated echo signal corresponds exactly to the actual echo signal coupled via the hybrid circuit. The echo return loss enhancement, or ERLE, is the degree to which the echo canceller suppresses the echo signal, i.e. the ratio of the echo signal to the residual echo signal.

As is also well known, it is necessary to inhibit adaptation of the adaptive filter whenever there is a so-called near end signal present, such a signal being coupled from the two-wire path to the four-wire transmit path, because such a signal constitutes noise as far as the convergence of the echo canceller is concerned. It is therefore common to provide a so-called double-talk detector which detects simultaneously-occurring signals in both directions of transmission, adaptation of the adaptive filter being inhibited in response to such detection.

A double-talk detector typically monitors the average signal levels on the four-wire receive path and on the four-wire transmit path prior to the subtraction unit, and determines a double-talk condition, i.e. that a near end signal is present, if the latter average signal level exceeds the former signal level reduced by the ERL. However, the ERL is unknown and must be estimated. Generally a fixed value, typically 6 dB, is arbitrarily selected and assumed for the ERL.

In practice, the ERL may change during a communication due to changes in line impedance or signal routing, and will change from one call to the next for networked echo cancellers. The actual ERL can range from 0 dB to 18 dB, so that the fixed value generally used can be a poor estimate of the actual ERL.

In the event that the estimated value of the ERL is less than the actual value, a double-talk condition can exist without being detected. In this case adaptation of the adaptive filter, i.e. updating of filter coefficients, will continue and the echo canceller will diverge from its desired state. Conversely, if the estimated value of the ERL is greater than the actual value, the echo signal can be mistaken for double-talk so that the adaptive filter will not be adapted and the echo canceller will never converge to its desired state.

Various references disclose the use of a fixed value for the ERL in a double-talk detector as discussed above. In addition, Rohrs et al. U.S. Pat. No. 4,918,727 issued Apr. 17, 1990 and entitled "Double Talk Detector For Echo Canceller And Method" describes a double-talk detector which monitors the ERLE to detect double-talk. This patent recognizes that an end path switch may result in a false double-talk detection and consequent failure to adapt the adaptive filter, and provides an end path switch detector to complement the ERLE monitoring for more reliable double-talk detection. However, obtaining a good estimate of actual ERL is not addressed in this prior art.

An object of this invention, therefore, is to facilitate determining echo return loss in an echo cancelling arrangement, so that a good estimate of the actual echo return loss can be provided. This good estimate can be used for example by a double-talk detector to provide a relatively accurate detection of a double-talk condition for inhibiting adaptation of the adaptive filter of the echo canceller.

SUMMARY OF THE INVENTION

According to one aspect of this invention there is provided a method of determining ERL (echo return loss) in an echo cancelling arrangement in which an estimated echo signal is produced from a receive path signal and is subtracted from an incoming transmit path signal to produce an outgoing transmit path signal, comprising the steps of: determining, from signal levels on the incoming and outgoing transmit paths, when an ERLE (echo return loss enhancement) due to the subtraction of the estimated echo signal exceeds a threshold value; and using a ratio, of signal levels on the receive path to signal levels on the incoming transmit path, when it is determined that the ERLE exceeds the threshold value, to provide a determination of ERL.

Preferably the step of using a ratio comprises averaging said ratio during times when it is determined that the ERLE exceeds the threshold value, and using the average as the determination of ERL.

The ERL determined in this manner is a relatively good estimate of the actual ERL, which accordingly may be used to facilitate accurate double-talk conditions or for other purposes as may be desired.

Another aspect of the invention provides a method of determining ERL (echo return loss) from a receive path to a transmit path via a hybrid circuit which couples the receive and transmit paths to a bidirectional communications path, in an echo cancelling arrangement in which an estimated echo signal is produced from a signal R on the receive path and is subtracted from a signal S on an incoming part of the transmit path to produce a signal T on an outgoing part of the transmit path, the method comprising the steps of: producing average levels Ra, Sa, and Ta of the signals R, S, and T respectively; and using a ratio Ra/Sa only during times when a ratio Sa/Ta exceeds a threshold value, thereby to provide a determination of ERL.

Preferably the step of producing the average levels Ra, Sa, and Ta comprises exponential averaging of levels of the signals R, S, and T respectively, the step of using a ratio Ra/Sa comprises averaging said ratio only during times when the ratio Sa/Ta exceeds the threshold value, and the step of averaging the ratio Ra/Sa comprises exponential averaging. The threshold value can conveniently be about 9 dB.

The invention also extends to an echo cancelling arrangement for coupling to a four-wire communications path which is coupled via a hybrid circuit to a two-wire communications path, for cancelling an echo signal coupled via the hybrid circuit from a receive path of the four-wire path to a transmit path of the four-wire path, the arrangement comprising: an adaptive filter having an input coupled to the receive path and an output for an estimated echo signal; a subtraction unit in the transmit path for subtracting the estimated echo signal from a signal on the transmit path; averaging means for producing averages Ra, Sa, and Ta of signal levels on the receive path and on the transmit path before and after the subtraction unit, respectively; means for determining ratios Ra/Sa and Sa/Ta; and means for using the ratio Ra/Sa, as a measure of echo return loss from the receive path to the transmit path via the hybrid circuit, when the ratio Sa/Ta exceeds a predetermined threshold value.

BRIEF DESCRIPTION OF THE DRAWINGS

The invention will be further understood from the following description with reference to the accompanying drawing, in which FIG. 1 illustrates an echo cancelling arrangement in accordance with an embodiment of the invention.

DETAILED DESCRIPTION

Referring to FIG. 1, a four-wire communications path, comprising a receive path 10 and a transmit path 12, is coupled to a bidirectional two-wire communications path 14 via a hybrid circuit 16. An echo cancelling arrangement includes an adaptive filter 18 and a subtraction unit 20. A far end signal, typically a voice signal, incoming on the receive path 10 as a signal R is supplied to the hybrid circuit 16, to be coupled to the two-wire path 14, and to an input of the adaptive filter 18. Near end signals incoming via the two-wire path 14, and an echo signal which is undesirably coupled via the hybrid circuit and corresponds to the signal R attenuated by the echo return loss ERL, are coupled from the hybrid circuit 16 as a signal S via an incoming pan of the four-wire transmit path to a positive input of the subtraction unit 20. A negative, or subtraction, input of the subtraction unit is supplied with an output of the adaptive filter 18, and an output of the subtraction unit 20 is coupled as a signal T to an outgoing part of the four-wire transmit path for transmission to the far end of the four-wire path. The adaptive filter 18 is adapted, i.e. filter coefficients therein are updated, in dependence upon a residual echo signal which is fed back to the adaptive filter from the output of the subtraction unit 20, in a manner which is intended to maximize the echo return loss enhancement ERLE provided by the echo cancelling arrangement.

As explained in the introduction, it is necessary to inhibit adaptation of the adaptive filter 18 when there is a near end signal present, because such a signal constitutes noise as far as the convergence of the echo canceller is concerned. Detection of a near end signal is usually achieved by a double-talk detector which inhibits adaptation of the adaptive filter if the average level of the signal S on the incoming pan of the four-wire transmit path exceeds the average level of the signal R on the four-wire receive path minus a fixed value, typically 6 dB, which is assumed for the ERL.

In accordance with this embodiment of the invention, the actual value of the ERL is determined in a manner as described below. This actual value of ERL can be used, instead of an assumed fixed value, by a double-talk detector to provide a much more reliable detection of double-talk conditions, thereby ensuring that the adaptation of the adaptive filter is carried out whenever appropriate, and only when appropriate. This in turn facilitates convergence of the adaptive filter and improved echo cancellation.

To this end, as shown in FIG. 1 the levels of the signals R, S, and T are averaged by averagers 22, 24, and 26 respectively to produce average signal levels Ra, Sa, and Ta respectively. A calculator 28 calculates an average value Ea of the ERLE from the average signal levels Sa and Ta in accordance with the equation Ea=Sa/Ta. A comparator 30 compares the average value Ea with a threshold value Th, and produces an enable signal En for a further averager 32 in the event that Ea>Th. A further calculator 34 calculates an average loss value La from the average signal levels Ra and Sa in accordance with the equation La=Ra/Sa. This average loss value La is supplied to and averaged by the averager 32 only when the averager 32 is enabled by the signal En, the averager 32 thereby producing at its output a calculated value of the ERL.

The averagers 22, 24, and 26 produce relatively short-term averages of the respective signal levels, representing the signal envelopes or signal powers of the respective signals. The average loss value La calculated by the calculator 34 correspondingly represents a relatively short-term average, because it is the ratio of the two short-term averages Ra and Sa. In the absence of a near end signal, this loss value La represents the ERL.

Likewise, the average ERLE value Ea calculated by the calculator 28 is a relatively short-term average, because it is the ratio of the two short-term averages Sa and Ta. This value Ea is dependent upon the level of any near end signal which may be present. In the presence of a near end signal at a sufficient level, the value Ea is relatively small because components of the near end signal are not subtracted by the subtraction unit 20. In the absence of a near end signal, or the presence of a near end signal at a very low level, the value Ea is relatively large (after convergence of the adaptive filter) because most or all of the transmit path signal S is constituted by the echo signal.

The threshold value Th can for example be a fixed value as described below. The comparator 30 produces the signal En when the value Ea exceeds this threshold value Th, and hence at times when there is a high ERLE so that the loss value La calculated by the calculator 34 is an accurate short-term average of the actual ERL. At these times, the averager 32 is enabled to average the loss value La, thereby producing an output which is an accurate relatively long-term average of the actual ERL. At times when the value Ea is not greater than the threshold value Th, the comparator 30 does not produce the signal En so that the averager 32 is not enabled. Consequently loss values La which occur during double-talk conditions are not averaged by the averager 32, so that divergence of the adaptive filter due to double-talk conditions is substantially avoided.

As the echo signal path via the hybrid circuit generally does not have a flat frequency response, and the far end signal R generally has a changing spectral content (e.g. in the case of speech signals), the averager 32 is provided to average the calculated value La at different times as enabled by the signal En, and thereby provide an accurate ERL measurement which accommodates these spectral characteristics. However, in the case of a signal R which has a substantially constant spectral content, for example a facsimile transmission signal, the averaging provided by the averager 32 is not necessary. In this case the value La calculated by the calculator 34 can be used directly as the measured ERL whenever the enabling signal En is produced by the comparator 30.

By way of example, all of the units 18 to 34 of the echo cancelling arrangement can be incorporated as functions of a digital signal processor. The signals R, S, and T can be sampled at a sampling frequency of 8 kHz, and the samples of each signal can be exponentially averaged by the respective averager 22, 24, or 26 all in a similar manner. For example, the averager 22 can operate in accordance with the equation:

$$Ra(n) = \alpha |R(n)| + (1-\alpha)Ra(n-1)$$

where R(n) represents a sample at the current instant n, Ra(n) represents the average Ra for the current instant n, Ra(n−1) represents the average Ra for the previous instant n−1, and $\alpha$ is an exponential averaging constant. The value of $\alpha$ is not critical; for example $\alpha=2^{-7}$. The averagers 24 and 26 can operate on their respective signals in a similar manner with the same constant.

The functions of the units 28 to 34 can be carried out at a much slower rate, for example every 24 ms. The averager 32 can also carry out exponential averaging of the calculated loss values La which occur when the enable signal En is produced. Thus the averager 32 can update its output, at each current instant m for which the enable signal En is produced by the comparator 30, according to the equation:

$$ERL(m) = \beta La(m) + (1-\beta)ERL(m-1)$$

where La(m) represents the loss value La calculated by the calculator 34 at the instant m, ERL(m) represents the resulting determined value of the echo return loss, ERL(m−1) represents the previous determined value of the echo return loss, and $\beta$ is an exponential averaging constant. The value of $\beta$ is also not critical; for example $\beta$ is in a range from $2^{-3}$ to $2^{-5}$. Although the instants m occur every 24 ms as indicated above, the averaged value of the ERL is only updated for those instants at which the signal En is produced.

The threshold value Th is chosen so that, when the value Ea exceeds this threshold value Th, the signal level Sa is an accurate measure of the echo signal, within a certain tolerance. Selection of an appropriate threshold value is explained below.

The signal S is constituted by an echo signal component E and a near end signal component N, which are uncorrelated so that their average powers add. Hence:

$$\overline{S^2} = \overline{E^2} + ee + +e, ovs\ \overline{N^2}$$

The effect of N is to make S greater than E by P dB, so that:

$$\overline{E^2} = \overline{S^2} (10^{-\frac{P}{10}})$$

and consequently:

$$\overline{N^2} = \overline{S^2} - \overline{E^2} = \overline{S^2} - \overline{S^2}(10^{\frac{-P}{10}}) = \overline{S^2}(1 - 10^{\frac{-P}{10}})$$

If the ERLE is Q dB, and it is assumed that the power of the near end signal component N is as great as or greater than the power of the echo component E, then:

$$Q = 10\log(\overline{S^2}) - 10\log(\overline{T^2}) = 10\log(\overline{S^2}) - 10\log(\overline{N^2})$$

and consequently:

$$Q = 10\log\left(\frac{\overline{S^2}}{\overline{N^2}}\right) =$$

$$10\log\left(\frac{\overline{S^2}}{\overline{S^2}(1 - 10^{\frac{-P}{10}})}\right) = -10\log(1 - 10^{\frac{-P}{10}})$$

Thus there is a correlation between the values P and Q, for example:

| P (dB): | 0.1 | 0.5 | 1.0 | 2.0 | 4.0 |
|---|---|---|---|---|---|
| Q (dB): | 16.4 | 9.6 | 6.9 | 4.3 | 2.2 | and it can be seen that, in order for the value Sa to be within P dB of the actual average level of the echo component E, the calculated value Ea of the ERLE must be greater than or equal to Q dB.

Because the accuracy of the exponential averaging as described above is about 1 dB, it is convenient to select for the threshold value Th a value of Q which ensures that the value of Sa also represents the echo component E of the signal R within a tolerance of about 1 dB. For example, a threshold value of Q=9 dB ensures this, and accordingly a fixed threshold value Th of 9 dB may conveniently be selected for use by the comparator 30 as described above. However, it can be seen from the above analysis that this threshold value is only an example of a suitable choice for double-talk detection, and that for this and other situations different threshold values Th may be used and may be preferred.

It is observed that, as the value of ERL produced by the averager 32 can be used for double-talk detection before any significant degree of echo cancellation has been achieved, the echo cancelling arrangement is initialized to the worst case (i.e. minimum) value of ERL to ensure that convergence of the adaptive filter is not inhibited. For example, an ERL value of 0, 3, or 6 dB may be assumed for the double-talk detection upon initializing the echo cancellation arrangement, until the adaptive falter 18 has converged and an accurate determination of the ERL is produced at the output of the averager 32.

Although a particular embodiment of the invention has been described above, it should be appreciated that numerous modifications, variations, and adaptations may be made without departing from the scope of the invention as defined in the claims.

What is claimed is:

1. A method of determining ERL (echo return loss) in an echo cancelling arrangement in which an estimated echo signal is produced from a receive path signal and is subtracted from an incoming transmit path signal to produce an outgoing transmit path signal, comprising the steps of:
   determining, from signal levels on the incoming and outgoing transmit paths, times when an ERLE (echo return loss enhancement) between signal levels on the incoming and outgoing transmit paths exceeds a threshold value; and
   determining ERL from a ratio, of signal levels on the receive path to signal levels on the incoming transmit path, only when it is determined that the ERLE exceeds the threshold value.

2. A method as claimed in claim 1 and including the step of averaging signal levels on the receive path and the incoming and outgoing transmit paths to provide averaged signal levels for use in said determining steps.

3. A method as claimed in claim 2 wherein the step of averaging signal levels on the receive path and the incoming and outgoing transmit paths comprises exponential averaging.

4. A method as claimed in claim 2 wherein the step of determining ERL from said ratio comprises averaging said ratio when it is determined that the ERLE exceeds the threshold value, and using the average as the determination of ERL.

5. A method as claimed in claim 4 wherein the step of averaging said ratio comprises exponential averaging.

6. A method as claimed in claim 4 wherein the threshold value is about 9 dB.

7. A method as claimed in claim 1 wherein the step of determining ERL from said ratio comprises averaging said ratio when it is determined that the ERLE exceeds the threshold value, and using the average as the determination of ERL.

8. A method as claimed in claim 7 wherein the step of averaging said ratio comprises exponential averaging.

9. A method as claimed in claim 8 wherein the threshold value is about 9 dB.

10. A method of determining ERL (echo return loss) from a receive path to a transmit path via a hybrid circuit which couples the receive and transmit paths to a bidirectional communications path, in an echo cancelling arrangement in which an estimated echo signal is produced from a signal R on the receive path and is subtracted from a signal S on an incoming pan of the transmit path to produce a signal T on an outgoing part of the transmit path, the method comprising the steps of: producing average levels Ra, Sa, and Ta of the signals R, S, and T respectively; and using a ratio Ra/Sa only when a ratio Sa/Ta exceeds a threshold value, to provide a determination of ERL.

11. A method as claimed in claim 10 wherein the step of producing the average levels Ra, Sa, and Ta comprises exponential averaging of levels of the signals R, S, and T respectively.

12. A method as claimed in claim 10 wherein the step of using a ratio Ra/Sa comprises averaging said ratio only when the ratio Sa/Ta exceeds the threshold value.

13. A method as claimed in claim 12 wherein the step of averaging the ratio Ra/Sa comprises exponential averaging.

14. An echo cancelling arrangement for coupling to a four-wire communications path which is coupled via a hybrid circuit to a two-wire communications path, for cancelling an echo signal coupled via the hybrid circuit from a receive path of the four-wire path to a transmit path of the four-wire path, the echo cancelling arrangement comprising:

an adaptive filter having an input coupled to the receive path and an output for an estimated echo signal;

a subtraction unit in the transmit path for subtracting the estimated echo signal from a signal on the transmit path;

averaging means for producing averages Ra, Sa, and Ta of signal levels on the receive path and on the transmit path before and after the subtraction unit, respectively;

means for determining ratios Ra/Sa and Sa/Ta; and means for using the ratio Ra/Sa, as a measure of echo return loss from the receive path to the transmit path via the hybrid circuit, only when the ratio Sa/Ta exceeds a predetermined threshold value.

15. An echo cancelling arrangement as claimed in claim 14 wherein each of the averaging means is arranged to produce an exponential average of the respective signal level.

16. An echo cancelling arrangement as claimed in claim 14 wherein the means for using the ratio Ra/Sa as a measure of echo return loss comprises means for averaging the ratio Ra/Sa when the ratio Sa/Ta exceeds the threshold value.

17. An echo cancelling arrangement as claimed in claim 16 wherein the means for averaging the ratio Ra/Sa is arranged to produce, as the measure of echo return loss, an exponential average of the ratio Ra/Sa when the ratio Sa/Ta exceeds the threshold value.

* * * * *